US012162495B2

(12) United States Patent
LaRoche et al.

(10) Patent No.: US 12,162,495 B2
(45) Date of Patent: Dec. 10, 2024

(54) ENGINE CONTROLS DURING TRANSMISSION SHIFT

(71) Applicant: FORD GLOBAL TECHNOLOGIES, LLC, Dearborn, MI (US)

(72) Inventors: Cory Benson LaRoche, Commerce Township, MI (US); Jianping Zhang, Ann Arbor, MI (US); Jesse D. L. Brunais, Livonia, MI (US); Stephen Michael Cicala, Dearborn Heights, MI (US); Michael S. Simon, Plymouth, MI (US); Paul Hollar, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/086,787

(22) Filed: Dec. 22, 2022

(65) Prior Publication Data

US 2024/0208510 A1 Jun. 27, 2024

(51) Int. Cl.
*B60W 30/19* (2012.01)
*B60W 10/06* (2006.01)
*B60W 10/11* (2012.01)

(52) U.S. Cl.
CPC ............ *B60W 30/19* (2013.01); *B60W 10/06* (2013.01); *B60W 10/11* (2013.01); *B60W 2510/0638* (2013.01); *B60W 2540/103* (2013.01); *B60W 2710/0616* (2013.01); *B60W 2710/0666* (2013.01)

(58) Field of Classification Search
CPC ...... B60W 30/19; B60W 10/06; B60W 10/11; B60W 50/082; B60W 2510/0638; B60W 2540/10; B60W 2540/103; B60W 2710/0666; B60W 2710/0616; B60W 2540/30; F02D 2200/502; F02D 41/0087; F02D 41/023
USPC .................................. 477/107, 109; 701/54
See application file for complete search history.

(56) References Cited

U.S. PATENT DOCUMENTS

| | | | |
|---|---|---|---|
| 6,434,466 B1 | 8/2002 | Robichaux et al. | |
| 8,099,224 B2 * | 1/2012 | Tripathi | F02D 41/0087 123/478 |
| 8,352,133 B2 | 1/2013 | Hopp | |
| 8,630,778 B2 | 1/2014 | Hopp | |
| 8,721,498 B2 * | 5/2014 | Schang | B60W 30/1882 477/111 |
| 2007/0032340 A1 * | 2/2007 | Hrovat | B60W 30/19 477/107 |
| 2012/0180759 A1 * | 7/2012 | Whitney | F02D 41/0007 123/406.23 |
| 2014/0045652 A1 * | 2/2014 | Carlson | F02P 9/005 477/109 |
| 2014/0057756 A1 * | 2/2014 | Nedorezov | B60W 30/18027 477/107 |
| 2015/0184599 A1 * | 7/2015 | Yokota | B60W 10/06 123/402 |

* cited by examiner

*Primary Examiner* — Huan Le
*Assistant Examiner* — Aimee Tran Nguyen
(74) *Attorney, Agent, or Firm* — Vincent Mastrogiacomo; Brooks Kushman P.C.

(57) ABSTRACT

A vehicle includes an engine and a transmission coupled to the engine. A vehicle controller is programmed to, in response to a shift of the transmission with the vehicle being in a sport mode or other precondition being present, command the engine to skip one or more fuel injector events of the engine during an inertia phase of the shift.

16 Claims, 3 Drawing Sheets

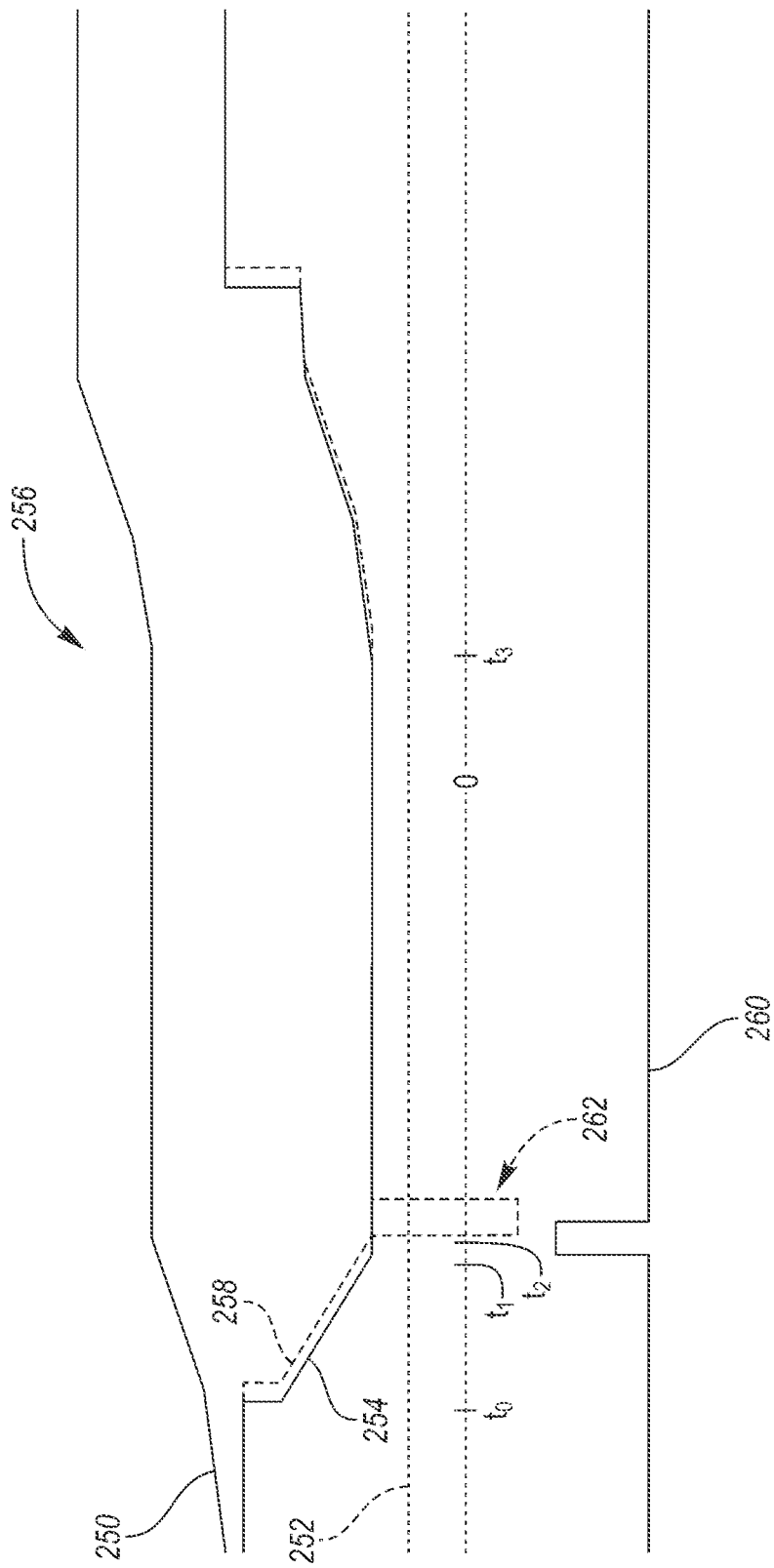

ENGINE CONTROLS DURING TRANSMISSION SHIFT

TECHNICAL FIELD

The present disclosure relates to vehicles having multi-speed transmissions and more specifically to controlling engine fuel injectors and spark plugs during transmission upshifts.

BACKGROUND

Vehicles may include transmissions that are configured to deliver power from an engine to one or more drive wheels at a speed and a torque that is different than that produced by the engine. The transmission may include multiple gears or speed ratios. Different types of transmissions are known such as automatic, manual, dual clutch, etc.

SUMMARY

According to one embodiment, a vehicle includes an engine and a transmission coupled to the engine. A vehicle controller is programmed to, in response to a shift of the transmission with the vehicle being in a sport mode (or other precondition being present), command the engine to skip one or more fuel injector events of the engine during an inertia phase of the shift.

According to another embodiment, a vehicle including an engine, a transmission coupled to the engine, and an accelerator pedal. The vehicle further includes a controller programmed to, during an upshift of the transmission, command the engine to skip one or more fuel injector events of the engine during an inertia phase of the upshift when the accelerator pedal is fully depressed.

According to yet another embodiment, a method of controlling a vehicle during an up shaft of a transmission includes, during an upshift of a transmission, selectively skipping one or more fuel injector events of the engine during an inertia phase of the upshift based on accelerator pedal position and a mode of the vehicle.

BRIEF DESCRIPTION OF THE DRAWINGS

FIG. 3 is a plot of various parameters during a performance upshift of the transmission.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
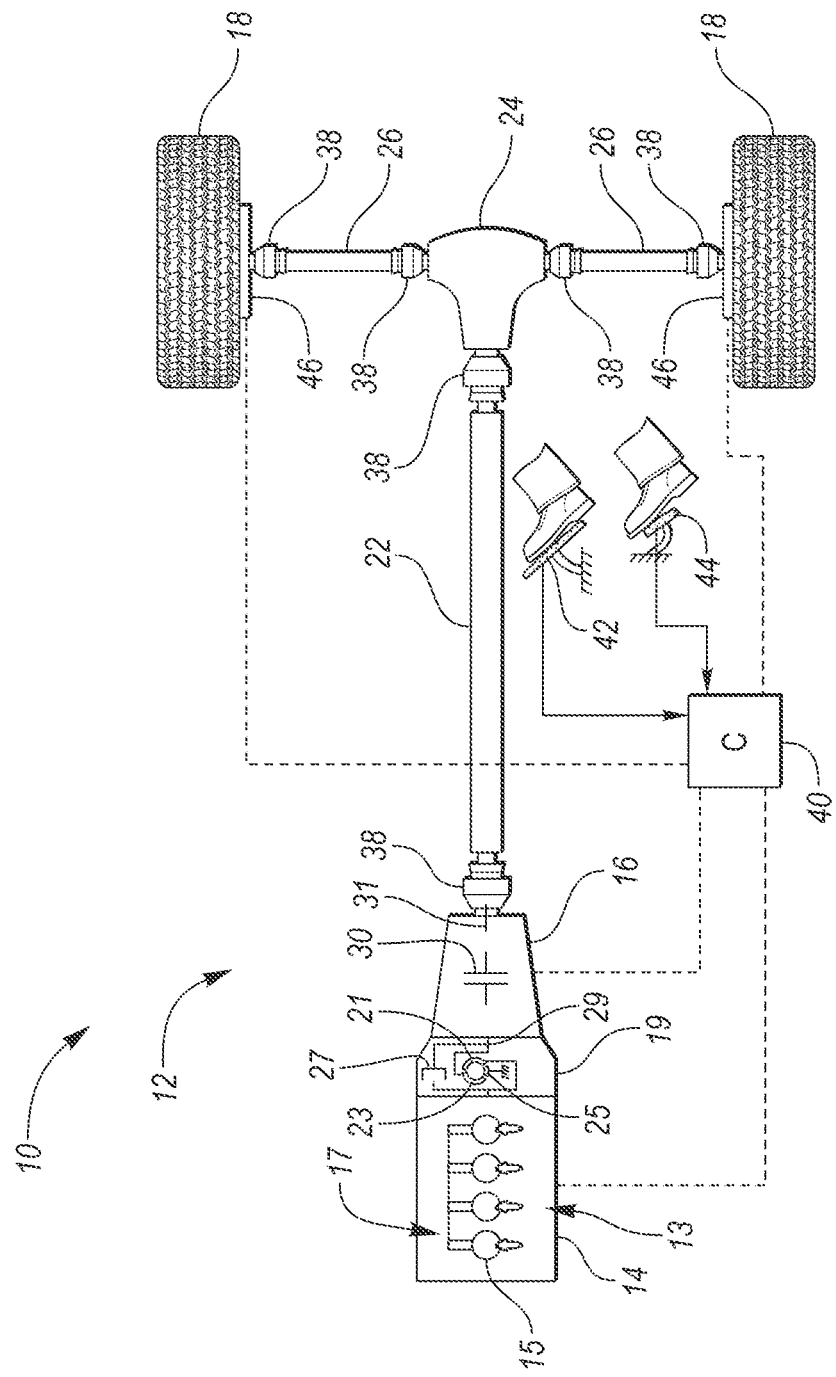
FIG. 1 is a schematic diagram representative of an exemplary vehicle having a powertrain including a multi-speed transmission.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 may include an engine 14 and a transmission 16. The engine 14 is configured to generate power. The transmission 16 may be a multiple step-ratio automatic transmission. The powertrain 12 may utilize other power generating components (e.g., electric motors) in addition to the engine 14. The transmission 16 may be a multi-speed step ratio transmission having multiple gear ratios (also known as speed ratios) between an input and an output of the transmission 16. The engine 14 is connected to the input of the transmission 16, e.g., transmission input shaft and the driven wheels are connected to the output of the transmission. (Used herein, "connected" refers to direct and indirect connection unless otherwise stated explicitly or through context.)

The engine 14 is illustrated as an in-line four-cylinder engine as an example. In other embodiments, the engine may include six, eight, 10, or 12 cylinders in either in-line or vee configurations. The engine 14 includes a plurality of cylinders 15. Pistons (not shown) are disposed in the cylinders 15 and reciprocate up and down as the engine rotates. The pistons are connected to a crankshaft (not shown) via connecting rods. The engine 14 may be a four-stroke engine having an intake stroke, a compression stroke, a combustion stroke, and an exhaust stroke. Fuel e.g., gasoline, may be injected into the cylinders 15 during the compression strokes. The gasoline may be injected by fuel injectors 17. During the combustion strokes (or in some cases just before top dead center) the spark plugs 14 ignite the compressed air-fuel mixture generating power and torque at the crankshaft.

The pistons are connected to the crankshaft at different angular positions so that each cylinder fires one at a time according to a firing order of the engine. For example, the engine 14 may have firing order of 1-3-4-2 and each piston fires every 720 degrees. The engine 14 can skip a combustion event of a cylinder by skipping the injection of fuel and/or subsequent spark. As will be explained in detail below, this may be done in response to a transmission shift under certain conditions.

The engine 14 may be connected to an input shaft 29 of the transmission by a torque converter 19 or a launch clutch while an output shaft 31 of the transmission 16 may be connected to a driveshaft 22. The driveshaft 22 may then be connected to a rear drive unit (RDU) 24. The RDU 24 may then be connected to the drive wheels 18 by half shafts 26. The RDU 24 may include a differential and/or one more clutches to control the power output to the wheels 18.

The torque converter 19 includes an impeller 21 fixed to the crankshaft of the engine 14, a turbine 23 fixed to the input shaft 29 of the transmission 16, and a stator 25. The torque converter 19 provides a hydraulic coupling between the crankshaft of the engine 14 and the input shaft 29. The torque converter 19 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 27 may also be provided that, when engaged, frictionally or mechanically couples the impeller 21 to the turbine 23, permitting more efficient power transfer. The torque converter bypass clutch 27 may be configured to transition between an opened (or disconnected) state, a closed (or locked) state, and a slipping state. The rotation of the impeller 21 and the turbine 23 are synchronized when the torque converter bypass clutch 27 is in the closed or locked state. The rotation of the impeller 21 and the turbine 23 are non-synchronized when the torque converter bypass clutch 27 is in the opened state or the slipping state.

The transmission 16 may include a step-ratio multispeed gearbox. The gearbox includes multiple gear sets (e.g., planetary gear sets) that are selectively engaged by shift elements, e.g., clutches and brakes, to establish the multiple discrete power-flow paths between the input shaft 29 and the output shaft 31. More specifically, the transmission 16 may have a plurality of clutches/brakes 30 configured to shift the transmission 16 between the plurality of gear ratios. The friction elements are controllable through a shift schedule that connects and disconnects certain elements of the gear sets to control the ratio between the input shaft 31 and the transmission output shaft 31. The transmission 16 is automatically shifted from one ratio to another based on various vehicle and ambient operating conditions by an associated controller, such as a powertrain control unit (PCU). Power and torque from the engine 14 may be delivered to and received by transmission 16. The transmission 16 then provides powertrain output power and torque to the driveshaft 22.

The various components of the powertrain 12, including the output shaft 31 of the transmission 16, driveshaft 22, RDU 24, half shafts 26, wheels 18, may be connected to each other, as described above, via constant-velocity joints 38 (or U-joints or other couplings in other embodiments). Constant-velocity joints connect two rotating parts and allow the two rotating parts to rotate under different axes.

Although FIG. 1 depicts a rear-wheel drive vehicle, the disclosure should not be construed as limited to rear-wheel drive vehicles. For example, the vehicle may be a front wheel drive vehicle that includes a power source (e.g., engine or electric motor) that is connected to a transaxle which in turn is connected to the front wheels. The transaxle may include a transmission and a differential in a single package. The transaxle is connected to the front wheels by half shafts. Constant-velocity joints may be disposed between any mating parts (e.g., between the half shaft and the wheels or between the half shaft and the transaxle.

The vehicle 10 includes a controller 40 that represents one or more controls that are in communication with each other. The vehicle may include multiple controllers for controlling different subsystems of the vehicle. For example, the transmission may include an associated controller and the engine may include an associated controller. While illustrated as one controller, the controller 40 may be part of a larger control system and may be controlled by various other controllers throughout the vehicle 10, such as a vehicle system controller (VSC). It should therefore be understood that the controller 40 and one or more other controllers can collectively be referred to as a "controller" that controls various actuators in response to signals from various sensors to control functions such as starting/stopping engine 14, select or schedule transmission shifts, etc. Any reference to "a" controller means one or more controllers. The controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 40 may communicate signals to and/or from engine 14, the transmission 16, the torque converter 19, etc. Although not explicitly illustrated, those of ordinary skill in the art will recognize various functions or components that may be controlled by controller 40 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery, clutch pressures for launch clutch and transmission clutch, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component presence, intake air flow (MAF), transmission gear, ratio, or mode, transmission oil temperature (TOT), transmission turbine speed (TS), torque converter bypass clutch 27 status (TCC), or shift mode (MDE) for example.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The vehicle may include multiple user-selected driving modes that modify various calibrations of the vehicle to provide the desired driving experience. Different vehicle manufactures have different names for their various drive modes. For example, normal mode is also known as touring or default mode, and sport mode is also known as track, racing, or competition mode. Some vehicles include multiple sport modes and use various names to differentiate between them. Used herein, "sport mode" describes any mode designed to provide an increased vehicle performance or sporty feel, and "normal mode" describes any mode associated with casual driving. The modes may be human and/or vehicle selected, e.g., the modes may be switched by a driver pressing a button or the vehicle may automatically switch modes based on sensed or inferred conditions. The transmission may include different calibrations based on the vehicle mode. For example, the transmission may include multiple shift schedules that are changed between when the driver switches between normal mode and sport mode. Generally, the transmission shift schedule encourages higher engine speeds and shorter shifts when in sport mode versus normal mode.

An accelerator pedal 42 is used by the driver of the vehicle to provide a desired or driver-demanded torque, power, or drive command to propel the vehicle. In general, depressing and releasing the accelerator pedal 42 generates an accelerator pedal position signal (sent from a sensor) that is representative of an accelerator pedal position and may be interpreted by the controller 40 as a demand for increased power or decreased power, respectively, or as a demand for increased torque or decreased torque, respectively. The accelerator pedal position signal may be expressed as a percentage of depression, e.g., 0% represents a fully released pedal and 100% represents a fully depressed pedal. Of course, the accelerator pedal position signal may be expressed in other ways as known in the art.

A brake pedal 44 is also used by the driver of the vehicle to provide a demanded braking torque to slow the vehicle. The brake pedal 44 may be configured to actuate the friction brakes 46 to slow the vehicle through a hydraulic, electrical, or other system when applied. In general, depressing and releasing the brake pedal 44 generates a brake pedal position signal that may be interpreted by the controller 40 as a demand to decrease the vehicle speed. Based upon inputs from the accelerator pedal 42 and brake pedal 44, the controller 40 commands the torque to the engine 14 and friction brakes 46.

The controller 40 also controls the timing of gear shifts within the transmission 16 based on one or more shift schedules that may be stored as tables within the controller. The shift schedules may be based on a demanded torque or power output via the accelerator pedal and a speed of the vehicle. The shift schedules may change based on a mode of the vehicle, e.g., NORMAL vs. SPORT.

It should be understood that the vehicle configuration described herein is merely exemplary and is not intended to be limited. Other non-hybrid or hybrid vehicle configurations should be construed as disclosed herein. Other vehicle configurations may include, but are not limited to, micro-hybrid vehicles and series hybrid vehicles.

Figure 2:
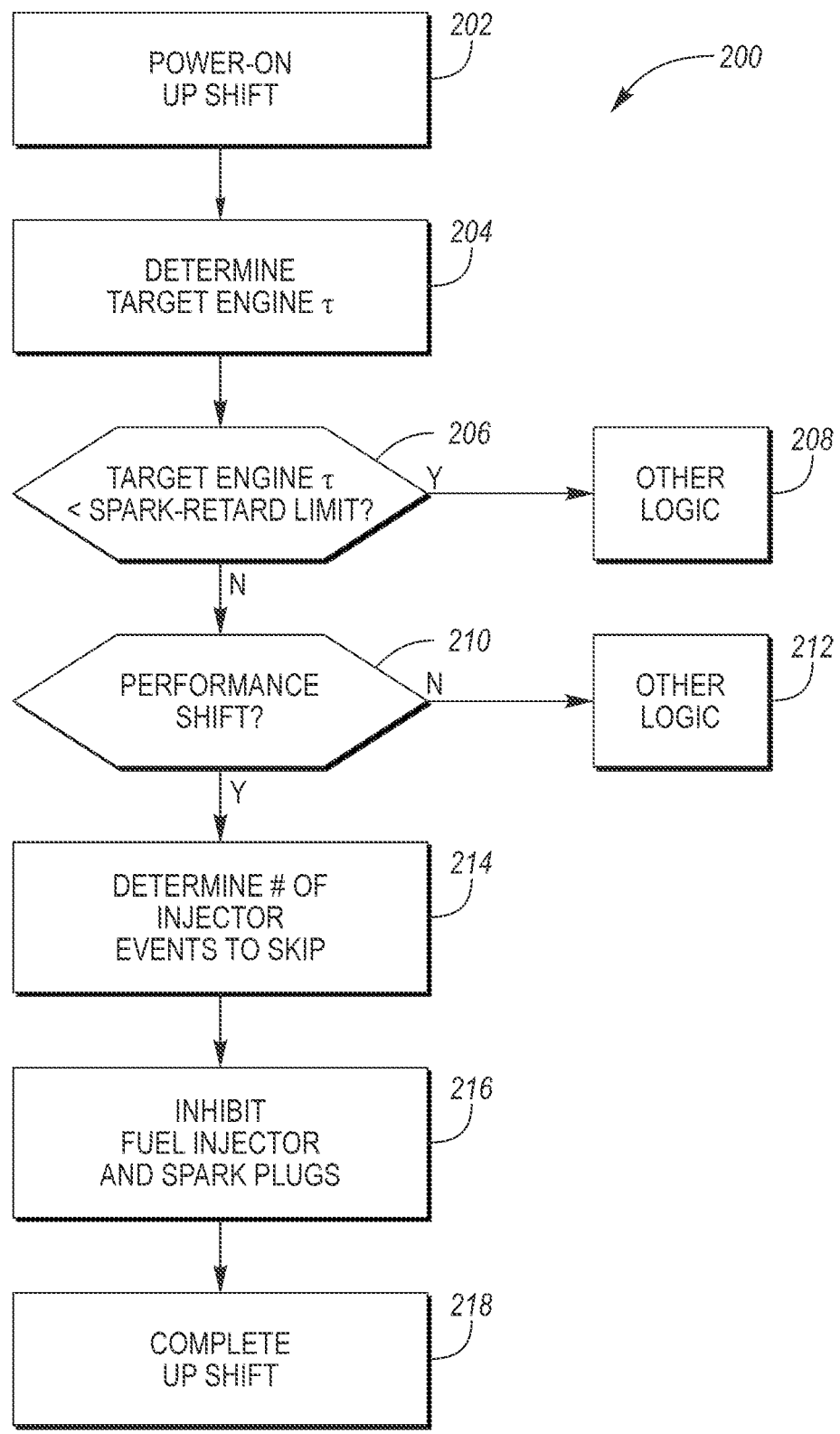
FIG. 2 is a flowchart of an algorithm for controlling a transmission upshift.

Referring to FIGS. 2, the controls 200 begin at operation 202 in response to initiation of a power-on upshift. A power-on upshift refers to an upshift that occurs when the accelerator pedal is depressed, or is depressed beyond a threshold. In operation 204, the controller determines the target engine torque for the upshift. The engine torque may be temporarily reduced during the upshift to reduce the shift time and improve smoothness. Various techniques for reducing engine torque may be performed, such as spark retard. Due to a variety of factors that are inherent with any particular engine, the engine torque can only be reduced so much without disturbing combustion stability. This may be referred to as the spark-retard limit. If the target engine torque is less than the spark-retard limit, then other logic is utilized at operation 208. This logic is described in applicant's co-pending application U.S. Ser. No. 17/977,397, (filed Oct. 31, 2022), the contents of which are hereby incorporated by reference in their entirety herein.

If no at operation 206, then the engine is able to meet the target engine torque using spark retard or the like. The controller may modify one or more parameters of the shift to increase sportiness when desired. Sportiness of the upshift may be increased by skipping one or more fuel injector events of the engine during an inertia phase of the shift, which causes a short duration of torque reduction (negative engine torque) and a popping noise through the exhaust system. A fuel injector event is the scheduled injection of fuel into the cylinder by the fuel injector as dictated by timing of the engine, which may be variable timing in some engines. A skipped fuel injector event is when the fuel injector is inhibited or otherwise does not inject fuel when it normally would. The fuel injector events may be consecutive, and the number may be less than the number of cylinders of the engine. Skipping an excessive number of injector events can reduce performance; therefore, the number of skips is a small, such as one to four events, for example. The number skips may be based on the inherent characteristics of the engine and transmission, engine speed, driver-demanded torque, vehicle mode, and desired shift feel.

At operation 210 the controller determines if a performance shift should be executed or not. Whether or not to perform a performance shift may be based on the mode of the vehicle and or the accelerator pedal position, for example. In some embodiments, a performance shift may be automatically executed whenever the vehicle is in a sport mode. In some implementations, the performance shift may be automatically executed whenever the vehicle is in an upper sport mode such as track mode and the performance shift may not be automatically executed when the vehicle is in a lower sport mode. In other embodiments, the decision for performance shift may be based on a combination of vehicle mode and accelerator pedal position. For example, the controller may include one or more pedal-position thresholds, that when exceeded, trigger a performance shift. The threshold may be tied to the vehicle mode. That is, the threshold for sport mode may be less (less pedal depression) than the threshold for normal mode. For example, the threshold may be 50% for sport mode and 80% for normal mode. In yet another embodiment the decision for performance shift may be based solely on the accelerator pedal position. This embodiment may be used in vehicles that do not include user-selectable drive modes or may be used in vehicles that do include user selectable drive modes.

If a performance shift is not desired in operation 210, control passes to operation 212 and other logic is used. If the performance shift is desired, control passes to operation 214, and the controller determines the number of fuel injector events to skip. The number of skips may be based on the engine speed such that the number of skips is higher when the engine speed is higher and the number of skips is lower when the engine speed is lower. The number of skips may be capped, for example, to be less than the number of cylinders of the engine. In other embodiments, they may be less than the number of cylinders of the engine. This is particularly true of engines having a high number of cylinders such as eight, ten, or twelve. In one embodiment, a V-8 engine may be capped at four skips.

In some embodiments, the controller associated with the transmission determines the number of fuel injector events to skip and the information is then sent to the engine controller, which inhibits the fuel injectors from injecting fuel and/or the spark plugs from sparking the desired number of skips. (For simplicity, these one or more controllers of been described as a single controller in the written description claims as explained above.) At operation 216, the engine controller receives the skip request from the transmission controller. The skips may be consecutive and which cylinders are skipped is based on the firing order and the angular position of the engine when the command for skips is received. For example, if the firing order of a four-cylinder engine is 1-3-4-2 and a command of three skips is received when piston 1 is just short of top dead center of the compression stroke, then the engine will stop the combustion events for cylinders 4-2-1 by inhibiting the injection of fuel and/or spark by the fuel injectors and spark plugs associated with cylinders 4, 2, and 1. In order to avoid unburnt fuel, cylinders 1 and 3 will spark as those cylinders already contained fuel when the command was received. (If unburnt fuel is not a constraint, inhibiting spark would reduce the delay allowing for a more immediate engine response.) Once the desired number of skips occurred, the engine resumes normal operation.

At operation 218, the transmission completes the upshift as is known in the art.

FIG. 3 illustrates a plot of an example transmission upshift in which one or more fuel injector events are skipped. Trace 252 represents the spark-retard limit of the engine, which is a positive value in the illustrated embodiment, but may be negative in others. The spark retard limit may correspond to timing the spark so that the spark occurs when the pistons of the engine 14 are at approximately −3° from top dead center. It is noted that spark may be retarded at any amount up to the spark retard limit depending upon the desired engine torque reduction. For example, spark may be timed to occur when the pistons of the engine 14 are at top dead center, −3° from top dead center, or any incremental value between top dead center and −3° from top dead center.

During this upshift the engine torque requested by the transmission (shown by trace 254) is never less than the limit 252. As such, a performance shift may be performed. In this plot, the shift has already started and capacity is building on the oncoming clutch as shown by trace 250. TO indicates the start of the ratio change, which is also the start of the inertia phase 256 of the shift. At the start of the ratio change, the oncoming clutch pressure 250 ramps up and the transmission commands a reduction in the commanded engine torque 254. The actual engine torque 258 (or measured or inferred) tracks the commanded torque 254 albeit with some delays and minor variations. After time TO, the controller commands the engine to retard the spark in order to decrease the engine torque 258 to match the requested engine torque 254. At time T1, the controller sends a skip command 260 that inhibits one or more fuel injector and spark plug events to skip one or more combustion events as discussed above. In the illustrated embodiment, the skip is for three fuel injector events. At time T2, the skip is complete and the command 260 ends. The time between times T1 and T2 is very short and is exaggerated in the plot for illustrative purposes. The skipping of injector events causes a sharp dip 262 in engine torque 258 (which is slightly delayed from the command) and, in the illustrated embodiment, causes the engine torque to become negative for a short duration of time. After time T2, the shift continues as normal and the controller continues to retard the spark of the engine in order to generate the commanded torque 254 until time T3. At time T3, the oncoming clutch pressure 250 and the commanded engine begins to ramp up to complete the shift.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle comprising:
an engine;
a transmission coupled to the engine; and
a controller programmed to, in response to a shift of the transmission with the vehicle being in a sport mode:
retard spark of the engine to reduce torque of the engine to a target value, and responsive to the torque of the engine achieving the target value, command the engine to skip one or more fuel injector events of the engine during an inertia phase of the shift.

2. The vehicle of claim 1, wherein the one or more injector events are consecutive.

3. The vehicle of claim 2, wherein the number of injector events skipped is less than the number of cylinders of the engine.

4. The vehicle of claim 1, wherein the controller is further programmed to retard spark of the engine to reduce torque of the engine to a target value that is greater than zero, wherein the torque of the engine during the skip is less than zero.

5. The vehicle of claim 1, wherein the controller is further programmed to, during the shift, retard spark of the engine to reduce torque of the engine to a target value, and the skip is commanded after the torque of the engine achieves the target value.

6. The vehicle of claim 1 further comprising an accelerator pedal, wherein the skip is commanded in response to the accelerator pedal being depressed beyond a threshold.

7. The vehicle of claim 6, wherein the threshold is based on a mode of the vehicle.

8. The vehicle of claim 7, wherein the threshold is greater in the sport mode than in a normal mode.

9. A vehicle comprising:
an engine;
a transmission coupled to the engine;
an accelerator pedal; and
a controller programmed to, during an upshift of the transmission, command the engine to skip one or more fuel injector events of the engine during an inertia phase of the upshift when the accelerator pedal is fully depressed, wherein the controller is further programmed to, during the shift, retard spark of the engine to reduce torque of the engine to a target value, and the skip is commanded after the torque of the engine achieves the target value.

10. The vehicle of claim 9, wherein the one or more injector events are consecutive.

11. The vehicle of claim 9, wherein the number of events skipped is based on a speed of the engine.

12. The vehicle of claim 9, wherein the transmission includes a step-ratio multi-speed gearbox.

13. A method of controlling a vehicle during an up shaft of a transmission, the method comprising:
during an upshift of a transmission when the vehicle is in sport mode, selectively skipping one or more fuel injector events of the engine during an inertia phase of the upshift, wherein the number of skipped fuel injector events is based on accelerator pedal position.

14. The method of claim 13, wherein the skipping one or more fuel injector events is in response to the accelerator pedal position exceeding a threshold that is based on the mode.

15. The method of claim 14, wherein a value of the threshold is less when in the sport mode than when in the normal mode.

16. The method of claim 13, wherein the one or more injector events are consecutive.

* * * * *